US009152863B1

(12) United States Patent
Grant

(10) Patent No.: US 9,152,863 B1
(45) Date of Patent: Oct. 6, 2015

(54) SYSTEMS AND METHODS FOR REMOTELY ASSESSING ROOF CONDITION

(71) Applicant: STATE FARM MUTUAL AUTOMOBILE INSURANCE COMPANY, Bloomington, IL (US)

(72) Inventor: Rosemarie Geier Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/335,666

(22) Filed: Jul. 18, 2014

(51) Int. Cl.
*G06K 9/00* (2006.01)
*G06Q 40/08* (2012.01)
*G06K 9/62* (2006.01)

(52) U.S. Cl.
CPC .......... *G06K 9/00637* (2013.01); *G06K 9/6201* (2013.01); *G06Q 40/08* (2013.01)

(58) Field of Classification Search
USPC ................................................. 382/209–220
See application file for complete search history.

(56) References Cited

U.S. PATENT DOCUMENTS

| 8,229,768 | B1* | 7/2012 | Hopkins, III | 705/4 |
| 8,650,106 | B1* | 2/2014 | Hopkins, III | 705/35 |
| 8,760,285 | B2* | 6/2014 | Billman et al. | 340/539.11 |
| 2013/0262029 | A1* | 10/2013 | Pershing | 702/156 |
| 2014/0099035 | A1* | 4/2014 | Ciarcia | 382/216 |
| 2014/0100889 | A1* | 4/2014 | Tofte | 705/4 |
| 2014/0132409 | A1* | 5/2014 | Billman et al. | 340/539.1 |
| 2014/0195275 | A1* | 7/2014 | Pershing et al. | 705/4 |

OTHER PUBLICATIONS

Genie Genetic Imagery Exploitation [online]. Los Alamos National Laboratory. [retrieved on Apr. 3, 2014]. Retrieved from the Internet: <URL: http://genie.lanl.gov/>.
Illsever, M. and Unsalan, C. Two-Dimensional Change Detection Methods. SpringerBriefs in Computer Science [online]. 2012 [retrieved on Apr. 3, 2014]. Retrieved from the Internet: <URL: http://www.google.com/url?sa=t&rct=j&q=&esrc=s&frm=1 &source=web&cd=14&ved=0CEgQFjAN &url=http%3A%2F%2Fwww.springer. com%2Fcda%2Fcontent%2Fdocument%2Fcda_ downloaddocument%2F9781447142546-c2. pdf%3FSGWID%3D0-0-45-1338819-p174516513 &ei=e8s9U4f8Mu7msAT2j4C4DA &usg=AFQjCNEI0sRJ7wyVI0EkSeQJRj4LS7zZng>. Chapter 2, pp. 7-21. DOI: 10.1007/978-1-4471-4255-3_2.

(Continued)

*Primary Examiner* — Wesley Tucker
(74) *Attorney, Agent, or Firm* — Marshall, Gerstein & Borun LLP; Randall G. Rueth

(57) ABSTRACT

A system for remotely assessing the condition of a roof of a building is disclosed. The system may compare multiple pieces of image data of the roof, representing the roof at different moments in time, to determine if at least a portion of the roof has been repaired, replaced or damaged in the time between the pieces of image data. If the roof is determined to have been repaired, replaced or damaged, the system may calculate a date of repair, replacement or damage of the roof that corresponds to the date on which at least one of the pieces of image data was captured or created. In the case where the roof has been repaired or replaced, the system may calculate the age of the roof based on the date of repair or replacement, and subsequently, calculate the actual cash value (ACV) of the roof based on the roof age.

28 Claims, 7 Drawing Sheets

(56) References Cited

OTHER PUBLICATIONS

Detecting Building Changes Through Imagery and Automatic Feature Processing. Hitachi Software Global Technology, Ltd. [retrieved on Apr. 3, 2014]. Retrieved from the Internet: <URL: http://downloads2.esri.com/campus/uploads/library/pdfs/58914.pdf>.

Guo, D., Xiong, H., Atluri, V., Adam, N. Object Discovery in High-Resolution Remote Sensing Images: A Semantic Perspective [online]. Rutgers University, USA, Department of Management Science and Information Systems. Jul. 2008. [retrieved on Apr. 3, 2014]. Retrieved from the Internet: <URL: http://datamining.rutgers.edu/publication/kais08b.pdf>.

* cited by examiner

SYSTEMS AND METHODS FOR REMOTELY ASSESSING ROOF CONDITION

FIELD OF DISCLOSURE

The present disclosure relates generally to building assessments, construction activity and more particularly, to assessing the condition of a roof structure.

BACKGROUND

A significant factor in property insurance liability is the replacement cost of roofs and roofing materials, especially in areas prone to severe weather. Accordingly, it may be desirable for insurance companies to offer insurance policies that cover the actual cash value (ACV) of a roof, rather than the replacement cost of the roof. ACV takes into account the depreciation in roof value that occurs naturally over the lifespan of the roof. For example, the ACV of a roof may be equal to the replacement cost of the roof multiplied by the percentage of useful remaining life of the roof. In order to accurately calculate the ACV, knowledge of the age of the roof is important.

For newer buildings, the age of the roof may correlate to the date on which the building was erected. This correlation, however, may not apply to older buildings because roofs are replaced periodically (e.g., every 20-50 years) due to ordinary wear and tear. In regions prone to severe weather, roofs may be replaced at more frequent intervals due to, for example, damage caused by wind and hail. Because a number of variables affect the timing of roof replacement, it is generally not possible to estimate roof age solely based on the date the building was erected.

One conventional method for determining roof age involves having an appraiser or inspector climb onto the roof and perform a visual inspection. This method exposes the inspector to the risk of falling, especially if the roof is icy or wet. In addition, this method can be costly and time-consuming as it requires an inspector with specialized training and, in some cases, requires an inspector to travel significant distances to reach the site of the building. Additionally, assessments by inspectors are inherently subjective and can lead to inconsistent and unreliable results. For instance, different lighting conditions and shingle types can make it difficult, even for an experienced inspector, to accurately assess the age of the roof.

In some cases, it is possible to assess roof age by referencing a public record of construction permits issued for roof replacement or repair. However, this method is not effective in jurisdictions which do not require a permit for roof repair or replacement. Furthermore, even if a permit is required, some building owners may skip the step of obtaining a permit, particularly if they plan to replace the roof themselves without the assistance of a professional construction company.

Until recently, satellite imagery was not considered a feasible option for determining roof age because of the substantial expense associated with traditional satellites, and because of the rather infrequent intervals with which traditional satellite systems can image a particular geographic location. Some older satellite systems, for example, may have the ability to image a particular geographic location only once a month. This aspect of older satellite systems, in combination with their significant cost, tends to make them an economically unattractive option for frequently monitoring a roof of a building or multiple building roofs.

SUMMARY

Disclosed herein is a system for remotely assessing a roof condition. The system includes one or more processors and one or more memories coupled to the one or more processors. The one or more memories includes non-transitory computer readable instructions that, when executed by the one or more processors, cause the one or more processors to: receive first image data of a roof of a building; receive second image data of the roof of the building, the second image data representing the roof at a later time than the first image data; receive time information including at least a date of creation of the first image data and a date of creation of the second image data; compare the first image data and the second image data to determine if the roof of the building has been repaired or replaced in the time between the first image data and the second image data; and when it is determined that the roof of the building has been repaired or replaced, determine a date of repair or replacement of the roof that is associated with at least one of the date of creation of the first image data or the date of creation of the second image data.

Also disclosed is a method for remotely assessing a roof condition. The method includes receiving, by a roof computer system, first image data of a roof of a building, and second image of the roof of the building. The second image represents the roof at a later time than the first image data. The method also includes receiving, by the roof computer system, time information including at least a date of creation of the first image data and a date of creation of the second image data. The method further includes comparing, by one or more processors of the roof computer system, the first image data and the second image data to determine if at least a portion of the roof of the building has been repaired or replaced in the time between the first image data and the second image data.

Further disclosed is a tangible computer-readable medium including non-transitory computer readable instructions that, when executed at one or more processors of a system for assessing a roof condition, cause the one or more processors to: receive first image data of a roof of a building; receive second image data of the roof of the building, the second image data representing the roof at a later time than the first image data; and compare the first image data and the second image data to determine if at least a portion of the roof of the building has been repaired or replaced in the time between the first image data and the second image data.

Additionally disclosed is a system for remotely assessing a roof condition. The system includes one or more processors and one or more memories coupled to the one or more processors. The one or more memories includes non-transitory computer readable instructions that, when executed by the one or more processors, cause the one or more processors to: receive first image data of a roof of a building; receive second image data of the roof of the building, the second image data representing the roof at a later time than the first image data; receive time information including at least a date of creation of the first image data and a date of creation of the second image data; compare the first image data and the second image data to determine if the roof of the building has been repaired or replaced in the time between the first image data and the second image data; and when it is determined that the roof of the building has been repaired or replaced, determine a date of repair or replacement of the roof that is associated with at least one of the date of creation of the first image data or the date of creation of the second image data.

DETAILED DESCRIPTION

Figure 1:
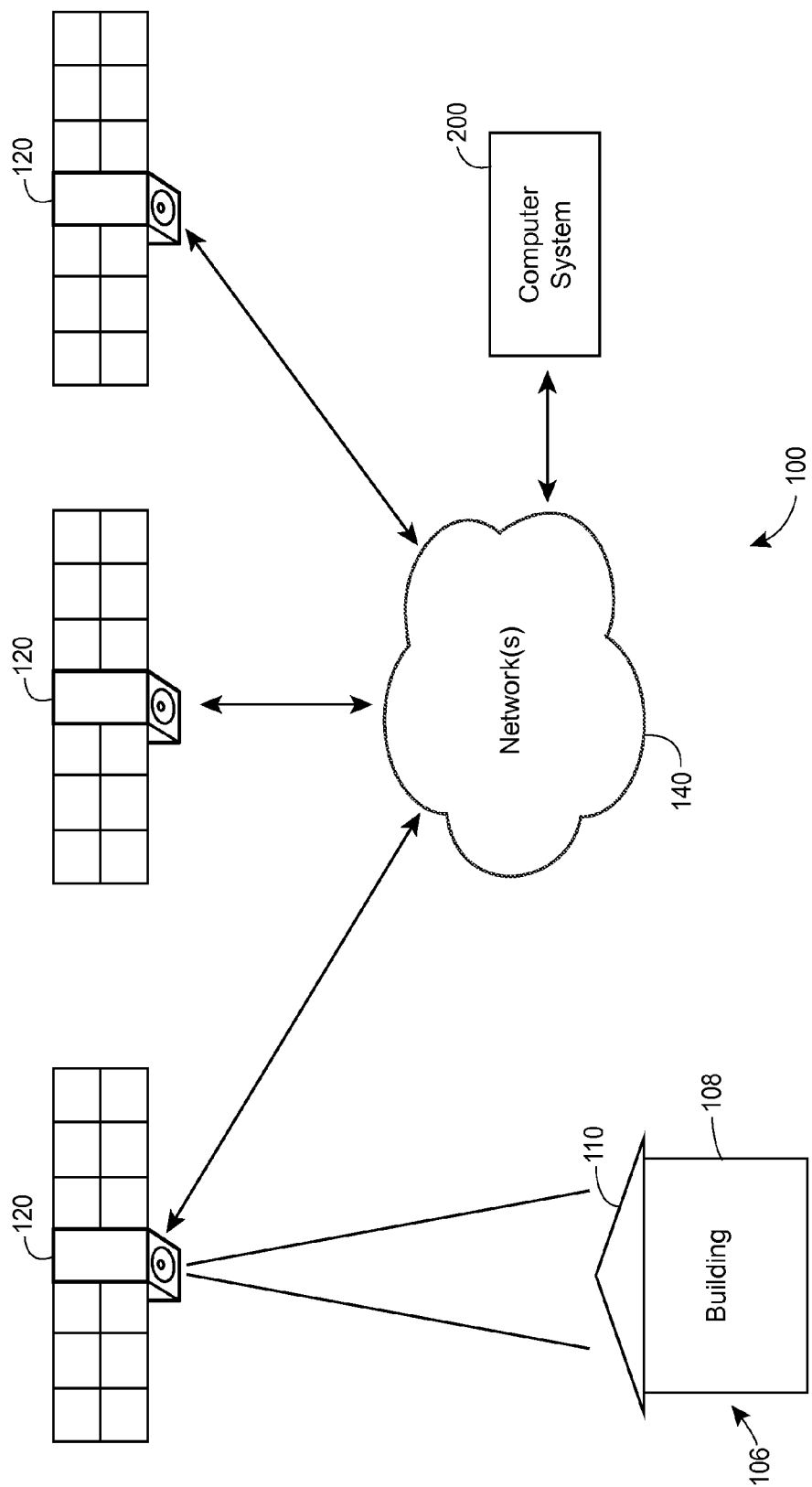
FIG. 1 illustrates a block diagram of an example environment having a computer system for assessing the condition of a roof in accordance with principles of the present disclosure.

The novel systems and methods disclosed herein relate generally to assessing the condition of a roof of a building to determine if the roof has been repaired, replaced or damaged. The assessment may be performed remotely and automatically by a system that compares pieces of image data representing the roof at different moments in time. The systems and methods may compare the pieces of image data to identify a change in the visual appearance or other physical property of the roof, including, for example, a change in roof color, a change in the heat signature or infrared radiation emitted by the roof, and/or a change in the reflectivity of the roof.

The image data may be associated with aerial and/or satellite imagery of the roof, and may include data associated with visible and non-visible wavelengths of electromagnetic radiation emitted from the roof. Also, the image data may include spatial, spectral, temporal and/or radiometric representations of the roof. The image data may be captured at relatively frequent intervals so that a date of repair or replacement of the roof can be accurately determined. In some embodiments, multiple pieces of image data of the roof may be captured over the course of a 12-hour period, a single day, a 2-day period, a 3-day period, or a shorter or longer period. By monitoring the roof on a daily basis, or at more frequent intervals, the systems and methods may accurately determine the date of repair or replacement of the roof, and based on this information, calculate the actual age of the roof. The systems and methods may be capable of analyzing many roofs in a large geographic region, for example, the entire Midwest of the United States, or a smaller or larger region, so that a database of roof ages for a large number of buildings may be compiled.

The systems and methods of the present disclosure may utilize satellite imagery captured by a flock of low-cost satellites, each having a resolution of approximately (e.g., ±10%) 50-100 cm, or lesser or greater. Recent developments in satellite technology have made such low-cost satellite systems more commonplace. These satellite systems may include a large number of relatively small satellites (e.g., 25-200 satellites) which are deployed to orbit the earth at fairly frequent intervals and thereby provide the ability to image a particular geographic location several times per day. While the resolution of these flock-type satellites may not be as high as large, traditional satellites, their low cost and ability to image the same location several times per day make them suitable for use with the systems and methods disclosed herein. The systems and methods of the present disclosure, however, are not limited to use with these newer, low-cost satellite systems, and may be implemented with, for example, traditional, large satellites having very high resolutions, and additionally, may be implemented with drones, planes and other aircraft capable of capturing aerial images.

Knowledge of the actual age of a roof of a building is useful in a variety of contexts. Insurance companies may employ roof age information to provide insurance policies that cover the actual cash value (ACV) of the roof of an insured building. As described below in more detail, the age of the roof may be used to account for depreciation in roof value so that the liability associated with replacing the roof, if damaged, is less than the replacement cost of the roof. Accordingly, roof age information gives insurance companies, as well as purchasers of property insurance, more flexibility in determining how to insure the roof of a building.

Roof age information may also be useful to construction companies who specialize in the repair and/or replacement of roofs. Such companies may use roof age information to send targeted advertisements to building owners whose roofs are nearing the end of their useful life. Realtors and appraisers may also benefit from accurate roof age information which may enable them to accurately calculate the actual value of a roof at the time of sale. Additionally, energy auditors and/or insulation contractors may utilize roof age or condition information to target building owners with old roofs that leak excessive amounts of heat.

In addition to analyzing the image data to determine the age of the roof, the systems and methods of the present disclosure can be used to determine if and when a roof has been damaged. This may entail analyzing the image data of the roof to determine if, for example, a portion of the roof is covered by a protective tarp (e.g., a blue, plastic tarp), or, for example, if a tree branch lies across the roof, or, for example, if excessive ponding of water exists on the roof after a rain event. The systems and methods of the present disclosure make it possible to identify such damage quickly and notify building owners and/or roof repair contractors.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

I. Exemplary Environment for Remotely Assessing Roof Condition

FIG. 1 depicts an example environment 100 associated with assessing the condition of a roof of a building to determine if the roof has been repaired or replaced. Although FIG. 1 depicts certain components and systems, it should be appreciated that additional or alternate components and systems are envisioned.

As illustrated in FIG. 1, the environment 100 includes a building 106 that may be a house, an apartment building, an office building, a store, a school, a factory, a warehouse, a garage, a barn, a shed or any other man-made structure erected above the ground. The building 106 may serve a variety of roles including providing security, shelter from weather, living space, privacy, working space, and/or storage space. The building 106 may be formed by a plurality of walls 108 covered by a roof 110.

The example environment 100 may include one or more satellites 120 configured to orbit the earth and obtain image data of the building 106 and its roof 110. The satellites 120 may be part of a flock of twenty-five or more satellites owned and operated by one or more third-party entities. Each of the satellites 120 may be relatively small, having a central body roughly the size of shoebox and a total weight of approximately (e.g., ±10%) 5 kg. The satellites 120 may each orbit the earth at least one time per day, and in some embodiments, each satellite 120 may orbit the earth multiple times during a single day. The flock of satellites 120, by virtue of their number and frequent orbits, may provide the capability to revisit and obtain image data for any point on earth two, three, four, five, six or more times per day. Accordingly, the satellites 120 collectively may provide multiple pieces of image data of the roof 100 of the building 106, as well as the roofs of other buildings, and the surrounding environment 100 at different times over the course of a 12-hour period, a single day, a 2-day period, a 3-day period, or a shorter or longer period.

The image data obtained by the satellites 120 may take the form of satellite imagery. The satellite imagery may include data associated with the visible, as well as the non-visible, wavelengths of electromagnetic radiation emitted from the roof. Also, the image data may include spatial, spectral, temporal and/or radiometric representations of the roof.

The resolution of the images captured by the satellites 120 may be approximately (e.g., ±10%) 50-100 cm, or lesser or greater. Accordingly, each pixel of the image may represent a square that measures about 50-100 cm on each side. In addition to providing still images of the earth, the satellites 120 may be capable of recording clips of high definition video, e.g., 90-second clips with 30 frames per second. The satellites 120 may also be able to detect the heat signatures of ground objects, for example, by detecting the infrared radiation emitted by these objects.

The satellites 120 may be configured to communicate the image data and other information with a computer system 200 via a network 140. The computer system 200 receives the image data via the network 140 and stores the image data to one or more memories. The computer system 200 may then determine if the roof 110 of building 106 has been repaired or replaced by comparing pieces of image data of the roof 110 at different moments in time. After determining that the roof 110 has been repaired or replaced, the computer system 200 may calculate the age of the roof 110 and generate a report that associates the age of the roof 110 with identification information of the building 106.

In general, an insurance provider may operate the computer system 200 to assess the roof condition of buildings that are insured by the provider. It should be appreciated, however, that other entities may employ the computer system 200 to assess roof condition. For example, roof repair companies that have an interest in locating building owners with old roofs in need of replacement may utilize the computer system 200. Additionally, realtors and building appraisers seeking to determine the current value of a building may employ the computer system 200. Also, energy auditors and/or insulation contractors may utilize the computer system 200 to target building owners with old roofs that tend to leak unacceptable amounts of heat.

In some embodiments, the computer system 200 may receive the image data from a device or system other than the satellites 120. For example, the computer system 200 may receive the image data from an external server or storage device (not illustrated) that stores image data from the satellites 120 in a manner that links each piece of image data with a particular geographic location. The external server or storage device may be managed by a third-party entity that also owns and operates the satellites 120. In still further embodiments, the image data may be received from unmanned aerial vehicle (e.g., a drone) in the form of an aerial image.

II. Exemplary Computer System for Remotely Assessing Roof Condition

Figure 2:
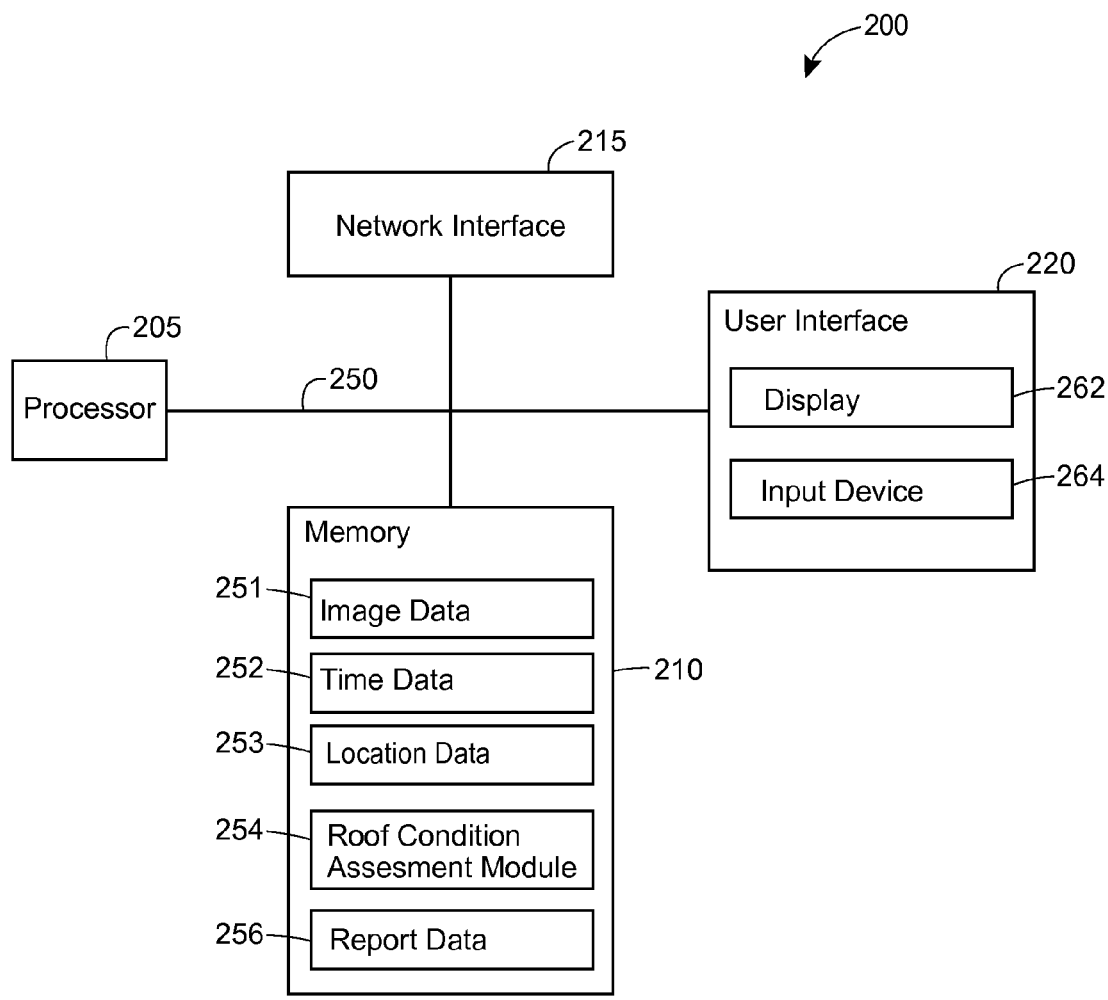
FIG. 2 depicts a block diagram of an example computer system on which a method of assessing roof condition may operate in accordance with principles of the present disclosure.

Referring to FIG. 2, illustrated is a block diagram of an example computer system 200 on which a method for assessing roof condition may operate in accordance with the described embodiments. The computer system 200 may take the form of any general purpose or special purpose computer or computing device. For example, the computer system 200 may be a personal computer, server, laptop, tablet, a set-top box, a multiprocessor system, a microprocessor system, or any other type of computer. Alternatively, the computer system 200 may be a distributed computing environment including multiple computing devices.

The computer system 200 may include one or more processors 205, a computer-readable memory 210, a network interface 215, a user interface 220, and a system bus 250. The processor 205 may communicate with the other components of the computer 200 via a system bus 250. The processor 205 is configured to fetch and execute instructions stored at the memory 210.

The network interface 215 is configured to establish communication via a network and may include an antenna, a port for a wired connection, a connection to a modem, a connection to a router, or some combination thereof. The User Interface (UI) 210 includes a display 262 and an input device 264 in this example. Generally speaking, the UI 220 may include any suitable input or output device(s), such as a touchscreen, a keyboard, a mouse and/or speakers. In some embodiments, a portion or the entire UI 220 may be remotely located relative to the other components of the computer system 200 and the UI 220 may communicate with the components of the computer system 200 via the network interface 215.

The memory 210 may be configured to store data, including instruction sets making up one or more services or programs and any data operated on or produced by such services or programs. The memory 210 may include volatile (e.g., RAM) and/or non-volatile memory (e.g., a hard disk), and may be a removable or non-removable memory. More particularly, the memory 210 may include image data 251, time data 252, location data 253, a roof condition assessment module 254, and report data 256. The image data 251 may include multiple aerial and/or satellite images of the roof 110, each being captured at a different time. For example, the image data 251 may include two or more aerial and/or satellite images of the roof 110 for each day of the past year, or longer. The image data 251 may include aerial and/or satellite images of roofs of multiple buildings in a large geographic region, e.g., the Midwest of the United States. The time data 251 may indicate a date and/or time when each of the aerial images was originally captured. The location data 253 may link each pixel, or group of pixels, of the image data to a particular geographic location. The location data 253 may include, for example, latitude and longitudinal coordinates, mailing address information and/or zip code information. As discussed further below, the roof condition assessment module 254 may be a program for determining if a roof has been repaired, replaced or damaged. The report data 256 may be generated in response to the determination performed by the roof condition assessment module 254.

The processor 205 may perform the methods or operations described herein. In some instances, performance of certain parts of the methods or operations described herein may be distributed among one or more processors residing across a plurality of machines. The one or more processors may share a similar geographic location in some instances (e.g., a server farm), or may be distributed across a number of geographically distinct areas. Moreover, the one or more processors may operate to support performance of relevant operations in a "cloud computing" environment. For example, at least some of the operations may be performed by a group of computers or by the previously described plurality of machines, wherein the operations are accessible via a network (accessible by, e.g., the network interface 215).

In operation, the computer system 200 receives image data, time data, and location data at the network interface 215 (via, e.g., the network 140 shown in FIG. 1). Alternatively, the image data, time data, and location data may be received at the UI 220 or at a peripheral device interface (not shown), such as a Universal Serial Bus (USB) interface. In any event, the received image data, time data, and location data are stored as at least part of, respectively, the image data 251, the time data 252, and the location data 253 at the memory 210. Any type of communication protocol may be implemented at the computer system 200 for receiving the image data, time data, and location data. For example, in some embodiments, the computer system 200 receives the image data, time data, and location data via a transfer initiated by another system, while in other embodiments the computer system 200 requests the image data, time data, and location data from another system, resulting in the other system transferring the image data, time data, and location data to the computer system 200. In one embodiment, a user may initiate a request for transfer of the image data, time data, and location data to the computer system 200 by submitting a request through the UI 220. The user's request may include identification information (e.g., a mailing address, latitude and longitude coordinates, etc.) of a building for which the user seeks to determine roof age and/or roof damage.

In further operation, the processor 205 executes the roof assessment module 254 to determine if a roof has been repaired, replaced or damaged by comparing pieces of image data representing the roof at different moments in time. As discussed in further detail below, comparing the pieces of image data of the roof may entail identifying: (i) a change in color of the (visible surface) roof, (b) a change in infrared radiation emitted by the roof, and/or (c) a change in reflectivity of the roof. The pieces of image data compared by the processor 205 may be captured at different times over the course of a 12-hour period, a single day, a 2-day period, a 3-day period, or a shorter or longer period. Alternatively, the aerial images compared by the processor 205 may be from consecutive days, weeks, or months.

Finally, the computer system 200 may generate a report of the condition of the roof and save the report to the memory 210 as at least part of the report data 256. The report may include information pertaining to the date of repair, replacement or damage of the roof, as well as, the age of the roof. The report may also associate the age of the roof with identification information (e.g., the mailing address of the building) of the building having the roof. Furthermore, the report may enable various textual or graphical representations of the age or condition of the roof (e.g., images, video, diagrams, charts, text, etc.). For example, in some embodiments an output may be provided at the display 262 (such as a television or computer monitor) based on the report. In other instances, a printer (not shown) may print one or more documents based on the report. The printer may be connected to a peripheral device interface at the computer system 200 (not shown), or may be in network communication with the computer system 200 via the network interface 215. In still other instances, the report may be saved as a file and transferred to another system (via, e.g., the network interface 215).

III. Exemplary Satellite Imagery

Figure 3A:
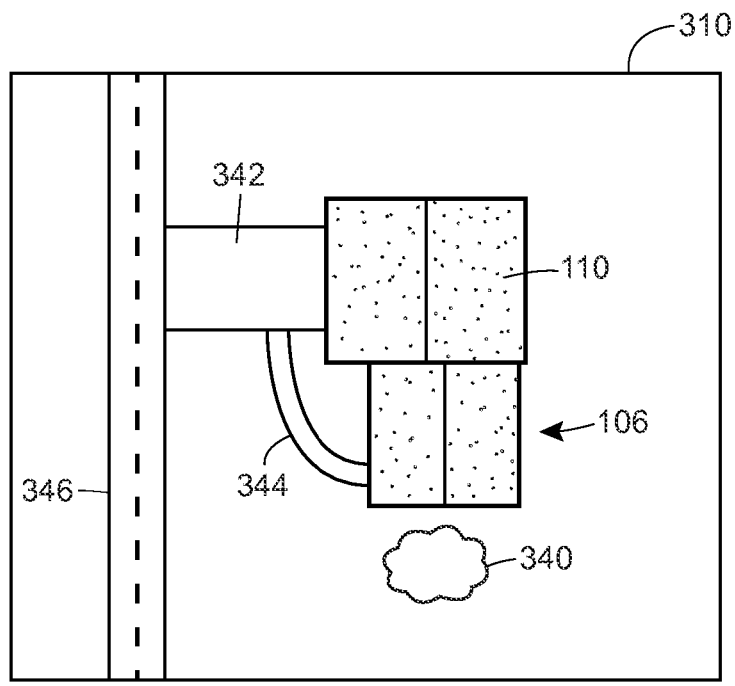
FIG. 3A-3C illustrates examples of satellite images of a roof before, during and after repair in accordance with principles of the present disclosure.
Figure 3B:
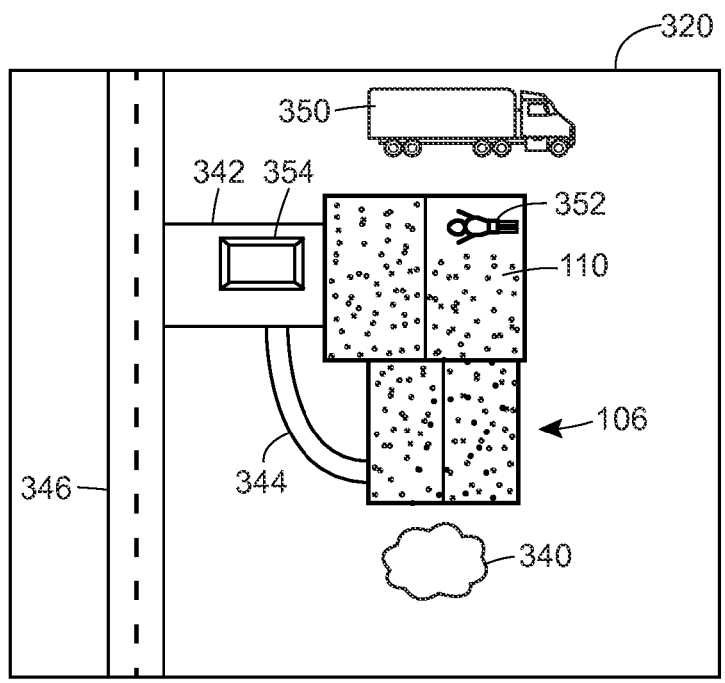
Figure 3C:
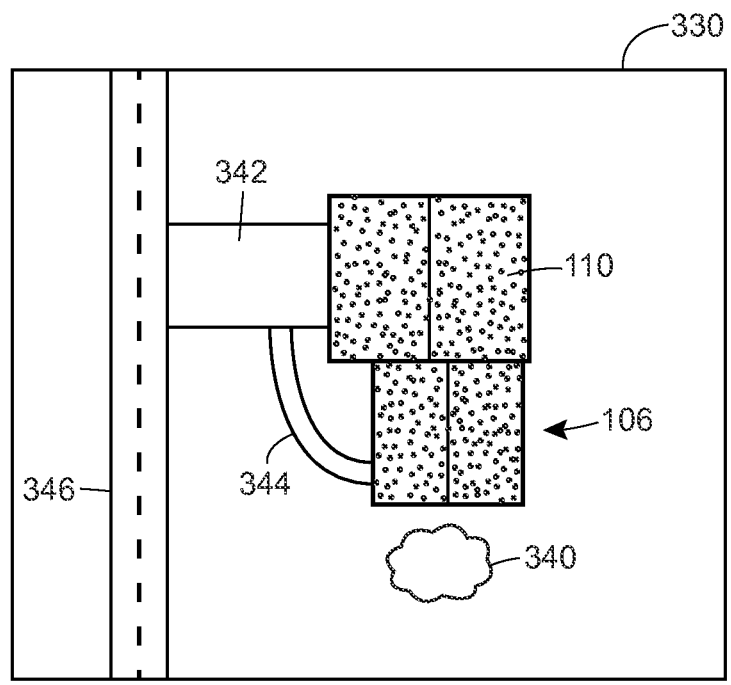

FIGS. 3A-3C illustrate several satellite images 310, 320, 330 of the roof 110 of the building 106 captured at different times. The satellite image 320 may be captured after the satellite image 310, and the satellite image 330 may be captured subsequent to the satellite image 320. The satellite images 310, 320, 330 may each be captured over the course of a 12-hour period, a single day, a 2-day period, a 3-day period, or a shorter or longer period. Alternatively, the satellite images 310, 320, 330 may be captured on successive weeks, months, or years. Each of the satellite images 310, 320, 330 may be captured by a respective one of the satellites 120 as its orbit passes over the building 106. Alternatively, some or all of the satellite images 310, 320, 330 may be captured by a single one of the satellites 120.

The satellite images 310, 320, 330 may be in color, black-and-white, gray-scale or any other suitable color scheme, and/or contain data from the non-visible electromagnetic spectrum. In one embodiment, the satellite images 310, 320, 330 are thermal images representing the infrared radiation emitted by the roof 110. The resolution of each of the satellite images 310, 320, 330 is approximately (e.g., ±10%) 5-100 cm per pixel, or lesser or greater. In some embodiments, the resolution may be lower than 100 cm per pixel, for example, in a range between 100-500 cm per pixel. Additionally, the resolution of the may be in the range between 5-500 cm per pixel. These resolution ranges may also be applicable to the case where the image data is comprised of aerial images captured by an aircraft such as a drone.

The satellite image 310 depicts the roof 110 before repair or replacement; the satellite image 320 shows the roof 110 during repair or replacement; and the satellite image 330 shows the roof 110 after repair or replacement. Other objects included in the satellite images 310, 320, 330 include a tree 340, a driveway 342, a walking path 344, and a road 346. The satellite image 320 further includes a construction vehicle 350 (e.g., a truck, crane, forklift, wheel loader, backhoe, etc.) parked next to the building 106, a construction worker 352 repairing/replacing roofing shingles or other roofing material, and a dumpster 354 parked on the driveway 342 to collect used shingles and other roof material. The change in color, reflectivity, infrared radiation emission, etc. caused by repairing or replacing the roof 110 is schematically shown in FIGS. 3A-3C by a change in the density of the dot pattern superimposed on the roof 110. For example, the new roofing material may have a darker color than the old roofing material and/or may be less reflective than the old roofing material. Further, the new roofing material may emit more or less infrared radiation than the old roofing material. The portion of the roof 110 in the immediate vicinity of the construction worker 352 depicted in FIG. 3B does not include a dot pattern because this portion of the roof 110 may have its shingles and tar paper completely removed such that the structural plywood of the roof 110 is exposed.

The satellite images 310, 320, 330 may be received and stored at a computer system (such as the computer system 200 illustrated in FIG. 2). The computer system may compare some or all of the satellite images 310, 320, 330 to determine if the roof has been repaired or replaced, as discussed in more detail below. The computer system may utilize fewer or more satellite images than those illustrated in FIGS. 3A-3C, as desired, and as needed to determine if the roof 110 has been repaired or replaced. The computer system may receive the satellite images directly from the satellites 120 via a network. Alternatively, the computer system may receive the satellite images from another computer system (e.g., a server or storage device).

Figure 4:
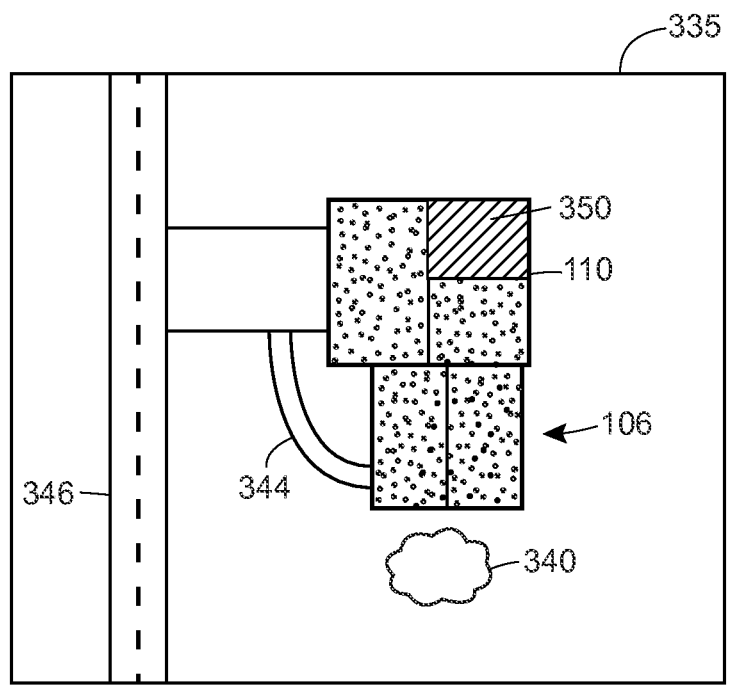
FIG. 4 is an example of a satellite image of a damaged roof in accordance with principles of the present disclosure.

FIG. 4 illustrates an example of a satellite image 335 depicting the roof 110 has been damaged and partially covered with a protective tarp 350. Oftentimes, after a severe weather event such as a tornado or hurricane, a large number of buildings in a particular area may have damaged roofs. As a temporary measure to protect against further damage to the building, building owners may place a plastic tarp, typically having a bluish color, over the damaged portion of the roof. The computer systems and methods of the present disclosure may be configured to identify such protective tarps, as discussed further below. Also, the computer systems and methods disclosed herein may be configured to identify other events associated with damage to the roof such as a tree branch lying across the roof, missing shingles, and/or excessive ponding of water on a flat roof after a rain storm.

While the foregoing images have been described as satellite images, in alternative embodiments, some or all of images may be aerial images by virtue of their capture by an aerial vehicle such as an airplane, unmanned aerial vehicle (e.g., drone), helicopter, etc.

IV. Exemplary Method for Remotely Assessing Roof Condition

Figure 5:
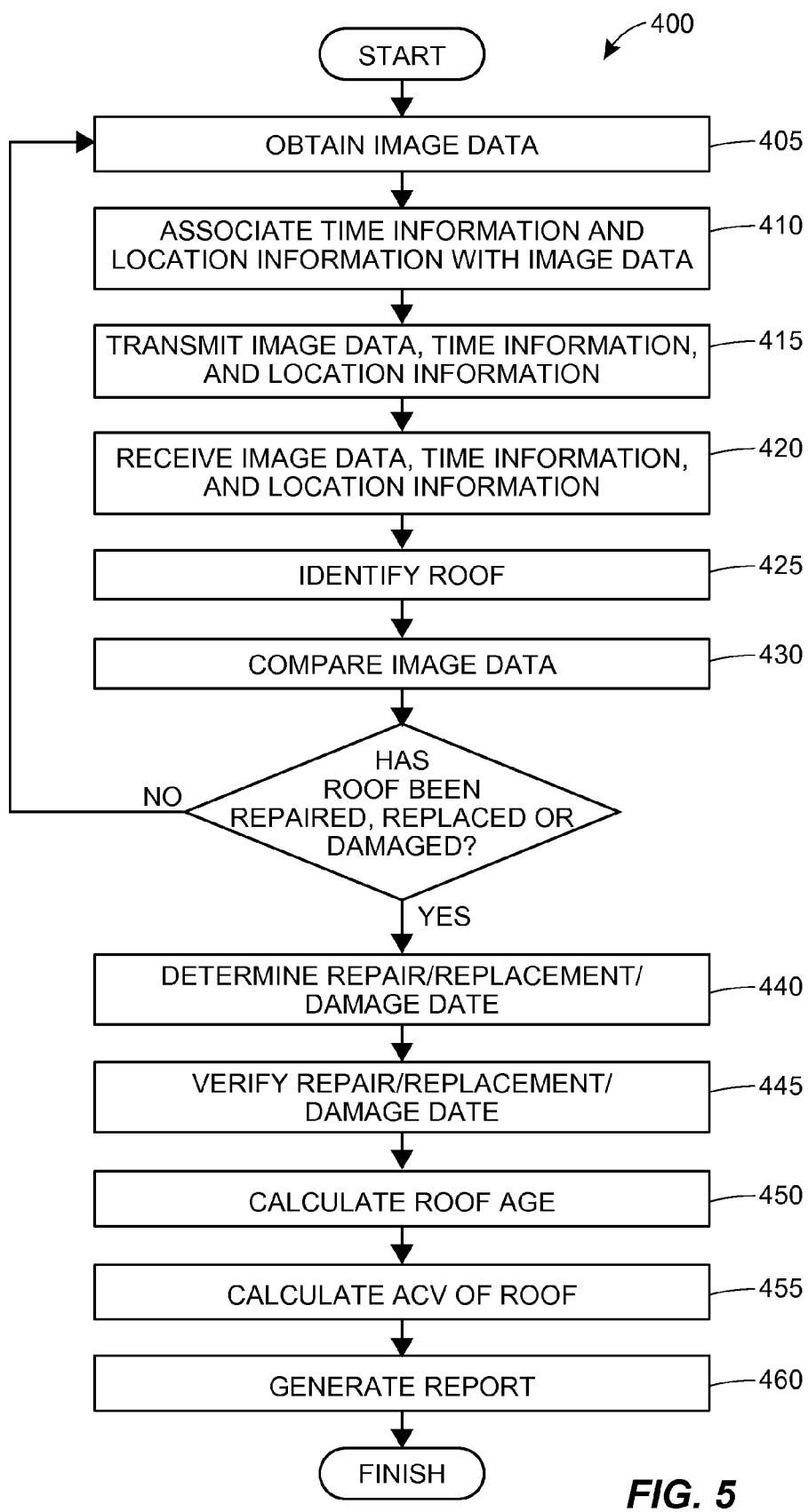
FIG. 5 illustrates an example method of assessing roof condition in accordance with principles of the present disclosure.

FIG. 5 illustrates an example method 400 for determining if a roof of a building has been repaired or replaced in accordance with the described embodiments. The method 400 may be implemented, in whole or in part, on one or more devices or systems such as the computer system 200 of FIG. 2. The method 400 may be saved as a set of instructions, routines, programs, or modules on a memory such as the memory 210 shown in FIG. 2. In particular, the method 400 may be saved as at least part of the roof condition assessment module 254 shown in FIG. 2.

The method 400 may begin with obtaining image data of a geographic region (e.g., a neighborhood, a city or town, a county, a state, the Midwest of the United States, the entire United States, or the entire earth, etc.) (block 405). The image data may include two, three or more sets of aerial and/or satellite images, with each of the aerial and/or satellite images being captured at a different time, and with each of the aerial and/or satellite images depicting a roof of a building. The image data may be captured over the course of a 12-hour period, a single day, a 2-day period, a 3-day period, or a shorter or longer period. The image data may be obtained by satellites that orbit the earth, such as the satellites 120 mentioned above, or aircraft, such as drones. The image data may be captured by a single satellite or by multiple satellites. For example, a first satellite may capture a first satellite image of the roof, followed by a second satellite that may capture a second satellite image of the roof, followed by a third satellite that may capture a third satellite image of the roof. As a supplement to the satellite imagery, or as an alternative to the satellite imagery, aerial images may be provided by an airplane, helicopter, drone, or other suitable device for viewing the earth from an altitude. Each of the satellite and/or aerial images may be digitized and saved as an image data file for subsequent computer processing.

After capturing the image data, time information and location information may be associated with each piece of image data (block 410). The time information may include the date and/or time that each respective piece of image data was captured. The location information may include a geographic indication of the portion of the earth represented by each respective piece of image data (e.g., latitude and longitude coordinates, a mailing address(es), a zip code, etc.). Different location information may be associated with, for example, different pixels, or different groups of pixels, of the image data. In one embodiment, the time information and the location information associated with a piece of image data may be embedded within a header.

After associating the time information and the location information with the image data, each of these items may be transmitted to a computer system (e.g., computer system 200) via a network (e.g., network 140) (block 415). The transmission may involve any type of data communication via any standard or technology including, but not limited to, GSM, CDMA, TDMA, WCDMA, LTE, EDGE, OFDM, GPRS, EV-DO, UWB, and/or IEEE 802 including Ethernet and/or WiMAX. In one embodiment, the image data, the time information, and the location information may be transmitted by way of a portable memory device such as a USB device and/or external hard drive. The pieces of image data may be transmitted as separate image data files, or as a single image data file. The time information and the location information corresponding to the image data may be embedded within a header of the image data file. Alternatively, the time information and the location information may be kept separate from the image data file.

Next, the computer system may receive the image data (which may be in the form of multiple image data files), the time information, and the location information at a network interface (e.g., network interface 215), user interface (e.g., UI 220), or a peripheral device interface such as a USB interface (block 420). The computer system then stores the image data, the time information, and the location information in a memory (e.g., memory 210) as, respectively, the image data 251, the time data 252, and the location data 253.

The computer system may then analyze each piece of the image data to identify a roof of a building, or a plurality roofs of a plurality of buildings (block 425). This step is described in more detail below with regard to FIG. 6.

After the roof of the building has been identified in each piece of image data, the computer system may compare the pieces of image data, representing the roof of the building at different moments in time, to determine if the roof has been repaired, replaced or damaged in the time between the pieces of image data (blocks 430 and 435). For example, the computer system may compare a first piece of image data and a second piece of image data to determine if the roof of the building has been repaired or replaced in the time between the creation or capture of first piece of image data and the creation or capture of the second piece of image data. In one embodiment, the computer system may determine that the roof has been repaired, replaced or damaged by identifying a change in the color signature of the roof. For example, the computer system may determine that a second piece of image data depicts the roof with a darker color, or a darker shade of a particular color, than the first aerial image, or vice versa. In one embodiment, the computer system may determine that a roof has been repaired, replaced or damaged in the case where an earlier piece of image data depicts the roof with a bluish color (indicating, e.g., a blue tarp placed over a damaged portion of the roof) and a subsequent piece of image data depicts the roof with a non-bluish color. The computer system may also determine that the roof has been repaired, replaced or damaged by identifying a change in the infrared radiation emitted by the roof in successive aerial images. Further, the computer system may determine that the roof has been repaired, replaced or damaged by identifying a change in the reflectivity of the roof. For example, an old roof may be identified as more reflective than a new roof. To determine if the roof has been damaged, the computer may compare the pieces of image data to determine a change in the appearance of the roof caused by, for example, a tree branch lying across the roof, missing shingles, a bluish-colored protective tarp placed over a portion of the roof, or excessive ponding of water on the roof after a rain event. The computer system may also include an algorithm that accounts for differences in lighting conditions and/or snow on the roof to ensure that the identified color change, infrared radiation emission change, and/or change in reflectively is actually due to the repaired, replaced or damaged of the roof.

If the computer system determines that the roof of the building has not been repaired, replaced or damaged, the method may return to block 405 to capture additional image data and perform blocks 410-430 again. Alternatively, the method may return to block 430 to compare pieces of image data, which have different capture times than those previously compared, to determine if roof repair or replacement occurred at a different time.

If the computer system determines that the roof of the building has been repaired, replaced or damaged, the method may proceed to determine the repair or replacement of the roof (block 440). This may be accomplished by setting the date of repair, replacement or damage as equal to the creation or capture date of one of the pieces of image data compared in block 430, or by setting the date of repair, replacement or damage as equal to a date which is between the creation or capture dates of the pieces of image data compared in block 430. In one embodiment, the date of repair, replacement or damage may set as equal to month or year of one of the pieces of image data compared in block 430.

After the date of repair, replacement or damage has been determined, the computer system may verify the date of repair or replacement by cross-referencing the date of repair or replacement with external information (block 445), which is described below in more detail with reference to FIG. 7.

Next, in the case where the roof has been determined to have been repaired or replaced, the computer system may calculate the age of the roof by calculating the amount of time between the date of repair or replacement and the current date (block 450). Subsequently, the computer system may calculate the ACV of the roof by taking into account the age of the roof (block 455). An exemplary ACV calculation is discussed below with regard FIG. 8.

Finally, the computer system may generate a report (block 460) that associates the age of the roof and/or the ACV of the roof with identification of the building (e.g., a mailing address of the building). The computer system may display the report on a display (e.g., display 262) to a user and/or print this report from a printer device. Also, the computer system may store the report in a memory (e.g., memory 210) as report data 256. The method 400 may be performed for a plurality of buildings with a plurality of roofs so that a database of roof ages and/or ACVs can be compiled.

In addition to the foregoing steps, the method 400 may include evaluating weather reports to identify a geographic region(s) which may have recently been affected by severe weather, and gathering aerial imagery of this region to determine if any roofs in the region has been damaged, repaired or replaced. This additional step may advantageously focus the analysis on regions where roofs are likely to have been repaired and replaced due to damage from severe weather elements such as hail and/or wind damage (e.g. tornado, hurricane, derecho, etc.).

The method 400 additionally may include a step of a user submitting a request to assess the roof condition of a particular building or group of buildings. The user may submit the request through the UI 220, for example, by inputting location information (e.g., a mailing address, longitude and longitude coordinates, zipcode, etc.) of the building or group of buildings. The user's request may cause the satellites, or other imaging devices, to capture image data of the geographic region including the building or buildings of interest to the user. If such image data already exists, the user's request may cause the computer system to analyze the image data according to blocks 430-460.

V. Exemplary Roof Identification Method

Figure 6:
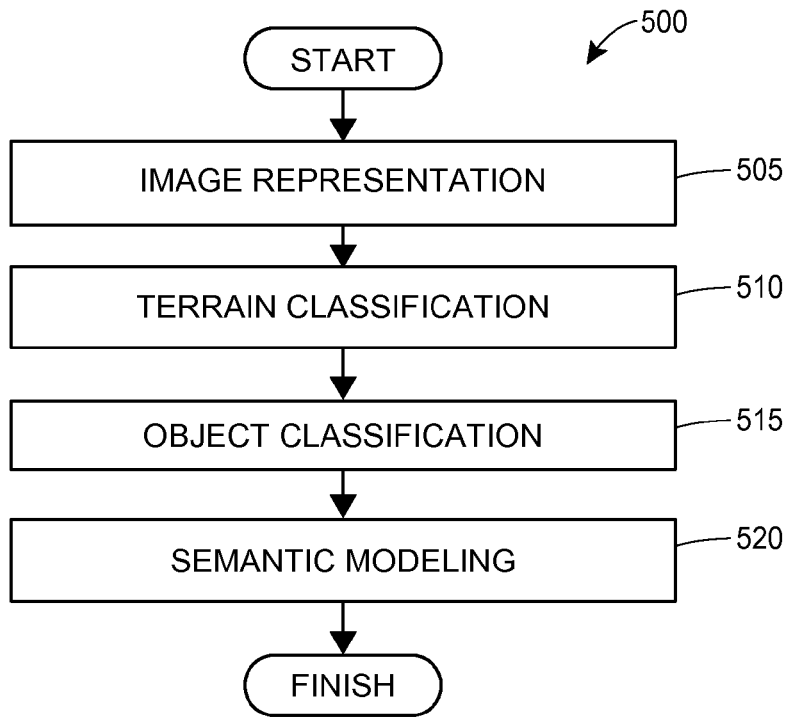
FIG. 6 depicts a flowchart of an example method of identifying a roof of a building in an aerial image in accordance with principles of the present disclosure.

Referring to FIG. 6, illustrated is an example of a roof identification method 500 that corresponds to block 425 of FIG. 5. The method 500 may be employed to analyze the image data to identify portion(s) of the image data that depict a roof of a building. The method 500 may begin by processing the image data to extract the texture and/or color features to create an image representation (block 505). Next, the terrain depicted the image data may be classified so that it can be masked or subtracted (block 510). For example, the portions of an image data depicting land-cover, water, and/or mountains may be masked or subtracted so that these portions of the image are not examined for roofs. Next, individual objects (e.g., roads, grasslands, trees, parks, parking lots, etc.) may be classified so that they too can be masked or subtracted (block 515). Finally, semantic modeling may be performed to identify building-like objects (e.g., a house, apartment building, office building, store, school, factory, warehouse, garage, barn, shed, etc.) (block 520). This step may involve detecting straight-line segments corresponding to walls and evaluating the size of an area enclosed by the walls to determine if the object is a building. Since the image data may be captured from above, the entire observed portion of the identified building may be determined to correspond to the roof of the building. The semantic modeling of block 520 may also be employed to identify other objects such as a construction vehicle (e.g., a truck, crane, forklift, wheel loader, backhoe, etc.) parked next to a building and/or a construction worker on the roof of the building. The identification of these non-roof objects may be utilized by the verification procedure discussed below.

VI. Exemplary Verification Method

Figure 7:
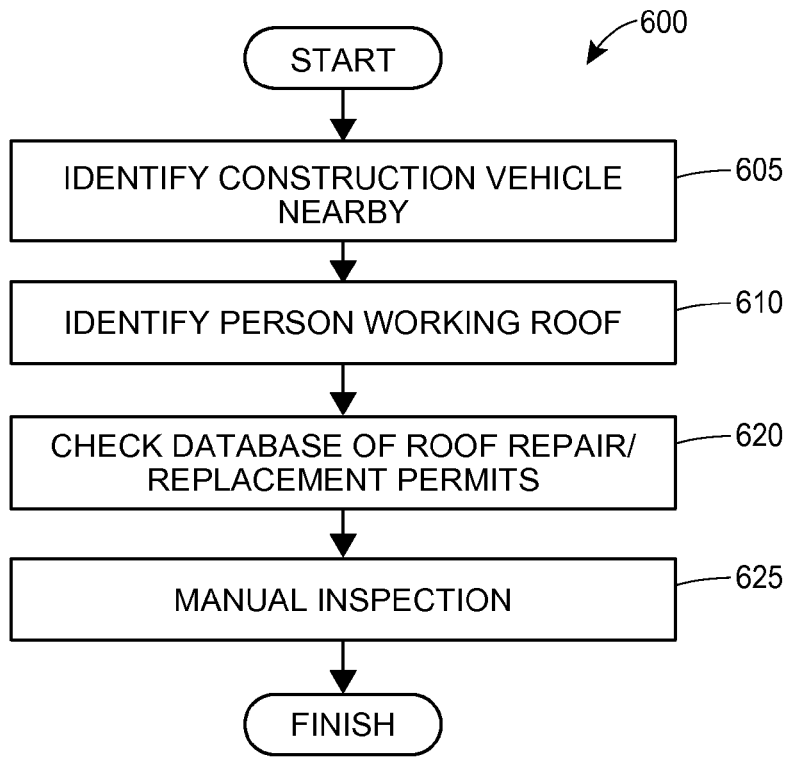
FIG. 7 is a flowchart of an example method of verifying a date of repair or replacement of a roof in accordance with principles of the present disclosure.

FIG. 7 illustrates is an example of a verification method 600 that corresponds to block 445 of the method 400 shown in FIG. 5. The verification method 600 may be used to confirm or refute the date of repair or replacement of the roof determined by analyzing the aerial imagery in blocks 430-440 of the method 400. Some or all of the steps of the method 600 illustrated in FIG. 7 may be performed as part of the verification functionality. The method 600 may start with analyzing the image data compared in block 435 to determine if a construction vehicle (e.g., a truck, crane, forklift, wheel loader, backhoe, etc.) is parked adjacent to the building (block 605). If so, the computer system 200 may record a confirmation that the creation or capture date of the image data depicting the construction vehicle corresponds to the date of repair or replacement of the roof. This confirmation may be included in the report generated in block 460 so that a user may know that the date of repair or replacement of the roof has been verified.

After block 605, the image data compared in block 435 may be analyzed to determine if a person is working on the roof (block 610). For example, the image data may be evaluated to determine if a construction worker is sitting, standing or kneeling on the roof. Such a determination may be used to confirm that the date of creation or capture of the image data corresponds to the date of repair or replacement of the roof. The confirmation may be recorded by the computer system 200 and included in the report data 256.

Next, the computer system 200 may retrieve public records of roof repair or replacement permits from, for example, an online government database (block 615). The computer system 200 may evaluate the public records to determine if a roof repair or replacement permit was issued for the building determined in block 435 to have a roof that has been repaired or replaced. The issue date of such a permit may then be compared to the date of repair or replacement of the roof determined in block 440. If the dates match, or are very similar, the computer system 200 may record a confirmation that the date of repair or replacement of the roof determined in block 440 is accurate. This confirmation may be included in the report data 256.

As an additional verification step, an inspector may travel to the building determined in block 435 to have a repaired or replaced roof to perform a manual inspection of the roof (block 620). This step may entail the inspector visually inspecting the roof and/or utilizing instruments to evaluate the condition of the roof. If the inspector determines that the roof has been repaired or replaced, the inspector may enter such information into the computer system 200 so that it can be included in the report data 256.

VII. Exemplary Actual Cash Value (Acv) Calculation Method

Figure 8:
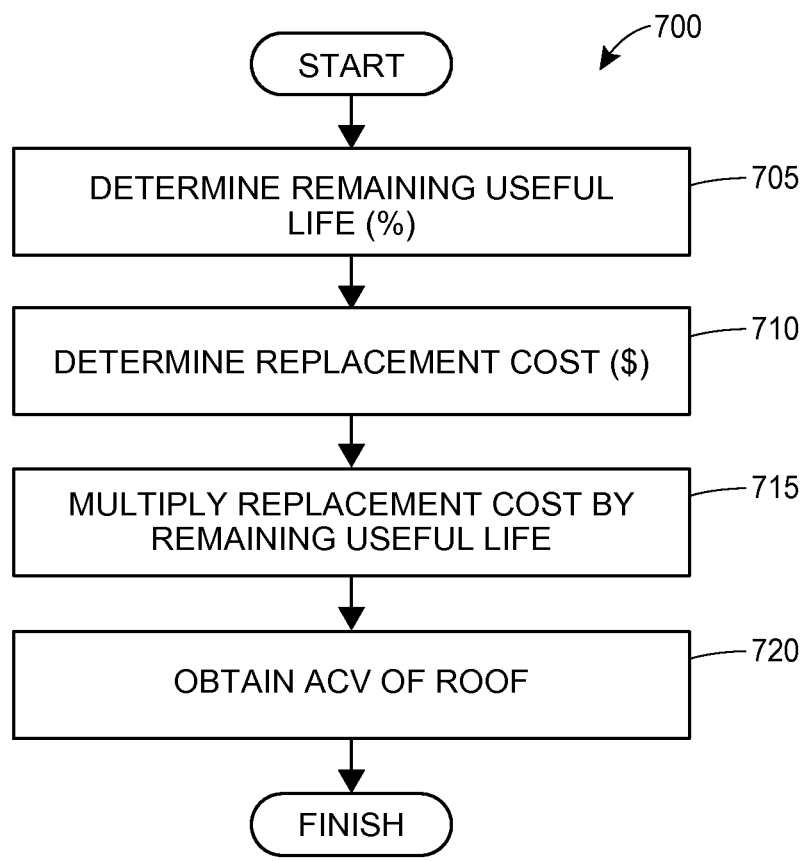
FIG. 8 is a flowchart of an example method of calculating an actual cash value (ACV) of a roof in accordance with principles of the present disclosure.

Referring to FIG. 8, illustrated is an example of a method 700 of calculating the ACV of a roof in accordance with block 455 of FIG. 5. The method 700 may begin by determining the remaining useful life of the roof based on the age of the roof (block 705). For example, if the age of the roof is determine to be ten years old, and the useful life of the roof is 20 years, then the remaining useful life is ten years or 50%. Next, the replacement cost of the roof may be determined by computing the cost to replace the roof today (block 710). The replacement cost may differ from the original cost of the roof due to the effects of inflation, increases/decreases in material/labor costs, etc. Next, the replacement cost is multiplied by the remaining useful life (which may be a percentage) to obtain the ACV of the roof (blocks 715 and 720). Continuing with the foregoing example, if the replacement cost was determined to be $5,000, then the ACV of the roof would be $5,000 multiplied by 50%, which is $2,500.

Knowledge of the actual age of the roof may enable insurance companies to provide property insurance policies which cover only the ACV of the roof. This may result in a reduction in the insurance premiums paid by the consumer.

VIII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for remotely assessing roof condition through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for remotely assessing a roof condition, the system comprising:
   one or more processors; and
   one or more memories coupled to the one or more processors, the one or more memories including non-transitory computer readable instructions that, when executed by the one or more processors, cause the one or more processors to:
      receive first image data of a roof of a building;
      receive second image data of the roof of the building, the second image data representing the roof at a later time than the first image data;
      receive time information including at least a date of creation of the first image data and a date of creation of the second image data;
      compare the first image data and the second image data to determine if at least a portion of the roof of the building has been repaired or replaced in the time between the first image data and the second image data;
      when it is determined that the roof of the building has been repaired or replaced, determine a date of repair or replacement of the roof that is associated with at least one of the date of creation of the first image data or the date of creation of the second image data; and
      determine an age of the roof based on the date of repair or replacement.

2. The system of claim 1, wherein the non-transitory computer readable instructions include instructions that cause the one or more processors to determine the age of the roof by calculating an amount of time between a current date and the date of repair or replacement.

3. The system of claim 2, wherein the non-transitory computer readable instructions include instructions that cause the one or more processors to generate a report that associates the age of the roof with identification information of the building.

4. The system of claim 3, wherein the identification information of the building includes at least one of an address of the building or latitude and longitude coordinates of the building.

5. The system of claim 1, wherein the first image data and the second image data represent the roof of the building at different times during a single day.

6. The system of claim 1, wherein an amount of time between creation of the first image data and creation of the second image data is less than 12 hours.

7. The system of claim 1, wherein the non-transitory computer readable instructions that cause the one or more processors to compare the first image data and the second image data include instructions that cause the one or more processors to identify at least one of: (a) a change in color of the roof, (b) a change in infrared radiation emitted by the roof, or (c) a change in reflectivity of the roof.

8. The system of claim 1, wherein the non-transitory computer readable instructions include instructions that cause the one or more processors to:
   receive a third image data of the roof of the building, the first image data, the second image data and the third image data depicting the roof of the building at different times during a 3-day period or less; and
   compare the third image data with the first image data and the second image data to determine if at least a portion of the roof of the building has been repaired or replaced in the time between the first image data and the third image data.

9. The system of claim 1, the first image data including a first aerial or satellite image of the roof and the second image data including a second aerial or satellite image of the roof.

10. The system of claim 1, wherein the first image data is received from a first satellite and the second image data is received from a second satellite.

11. The system of claim 1, the first image data and the second image data each including data associated with at least one non-visible wavelength of electromagnetic radiation emitted from the roof of the building.

12. A method for remotely assessing a roof condition, the method comprising:
   receiving, by the roof computer system, first image data of a roof of a building;
   receiving, by the roof computer system, second image data of the roof of the building, the second image data representing the roof at a later time than the first image data;
   receiving, by the roof computer system, time information including at least a date of creation of the first image data and a date of creation of the second image data;
   comparing, by one or more processors of the roof computer system, the first image data and the second image data to determine if at least a portion of the roof of the building has been repaired or replaced in the time between the first image data and the second image data;
   determining, by the roof computer system, a date of repair or replacement of the roof that is associated with at least one of the date of creation of the first image data or the date of creation of the second image data; and
   determining, by the roof computer system, an age of the roof based on the date of repair or replacement.

13. The method of claim 12, comprising:
   determining, by the roof computer system, the date of repair or replacement of the roof as being: (i) equal to one of the date of creation of the first image data or the date of creation of the second image data, or (ii) between the date of creation of the first image data and the date of creation of the second image data.

14. The method of claim 12, wherein the first image data and the second image data represent the roof of the building at different times during a single day.

15. The method of claim 12, comprising verifying that at least a portion of the roof of the building has been repaired or replaced by at least one of: (a) identifying a construction vehicle parked adjacent to the building in at least one of the first image data or the second image data, (b) identifying a person working on the roof in at least one of the first image data or the second image data, (c) analyzing a database including roof repair permits to determine if a roof repair permit has been issued for the building, or (d) manually inspecting the roof of the building.

16. The method of claim 12, wherein the comparison of the first image data and the second image data comprises identifying at least one of (a) a change in color of the roof, (b) a change in infrared radiation emitted by the roof, or (c) a change in reflectivity of the roof.

17. The method of claim 12, comprising capturing the first image data with a first satellite and capturing the second image data with a second satellite.

18. The method of claim 12, the first image data including a first aerial or satellite image of the roof of the building and the second image data including a second aerial or satellite image of the roof of the building.

19. A non-transitory tangible computer-readable medium including non-transitory computer readable instructions that, when executed at one or more processors of a system for assessing a roof condition, cause the one or more processors to:
  receive first image data of a roof of a building;
  receive second image data of the roof of the building, the second image data representing the roof at a later time than the first image data;
  receive time information including at least a date of creation of the first image data and a date of creation of the second image data;
  compare the first image data and the second image data to determine if at least a portion of the roof of the building has been repaired or replaced in the time between the first image data and the second image data;
  determine a date of repair or replacement of the roof that is associated with at least one of the date of creation of the first image data or the date of creation of the second image data; and
  determine an age of the roof based on the date of repair or replacement.

20. The non-transitory tangible computer-readable medium of claim 19, wherein the instructions, when executed, cause the one or more processors to generate a report that associates the age of the roof with identification information of the building.

21. The non-transitory tangible computer-readable medium of claim 20, wherein the identification information includes at least one of an address of the building or latitude and longitude coordinates of the building.

22. The non-transitory tangible computer-readable medium of claim 19, the first image data and the second image data each including data associated with at least one non-visible wavelength of electromagnetic radiation emitted from the roof of the building.

23. A system for remotely assessing a roof condition, the system comprising:
  one or more processors; and
  one or more memories coupled to the one or more processors, the one or more memories including non-transitory computer readable instructions that, when executed by the one or more processors, cause the one or more processors to:
    receive first image data of a roof of a building from a first satellite;
    receive second image data of the roof of the building from a second satellite, the second image data representing the roof of the building at a later time during the same day as the first image data;
    receive time information including at least a date of creation of the first image and a date of creation of the second image data;
    compare the first image data and the second image data to determine if at least a portion of the roof of the building has been damaged in the time between the first image data and the second image data; and
    when it is determined that the roof of the building has been damaged, determine a date of damage to the roof that is associated with at least one of the date of creation of the first image data or the date of creation of the second image data.

24. The system of claim 2, wherein the non-transitory computer readable instructions include instructions that cause the one or more processors to calculate an actual cash value of the roof based on the age of the roof and update an insurance policy to reflect the actual cash value of the roof.

25. The system of claim 1, wherein the first image data and the second image data each have a resolution within a range of 50-100 cm per pixel.

26. The method of claim 12, wherein the first image data and the second image data each have a resolution within a range of 50-100 cm per pixel.

27. The non-transitory tangible computer-readable medium of claim 19, wherein the first image data and the second image data each have a resolution within a range of 50-100 cm per pixel.

28. The system of claim 23, wherein the first image data and the second image data each have a resolution within a range of 50-100 cm per pixel.

* * * * *